M. KERWICK.
RECEPTACLE.
APPLICATION FILED AUG. 18, 1909.
972,456.
Patented Oct. 11, 1910.
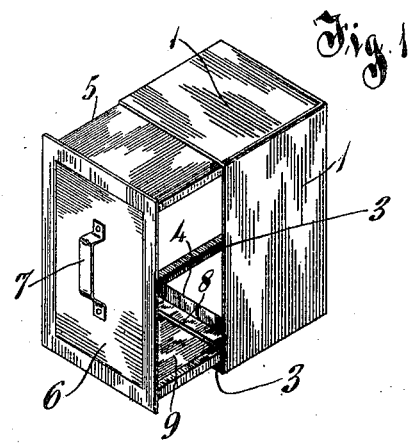
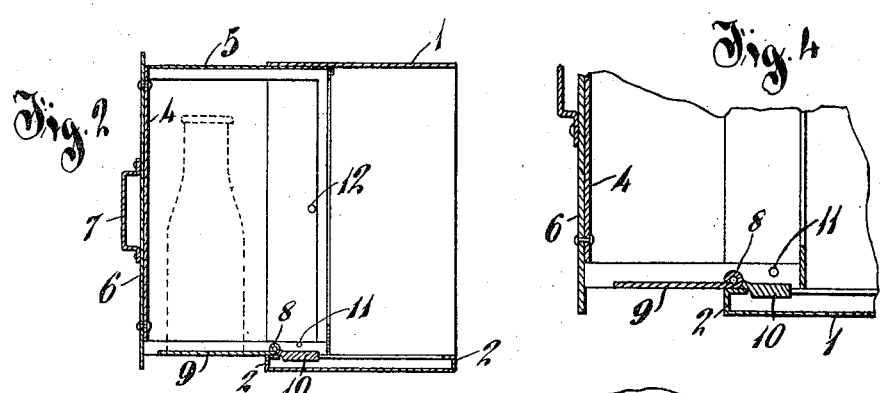
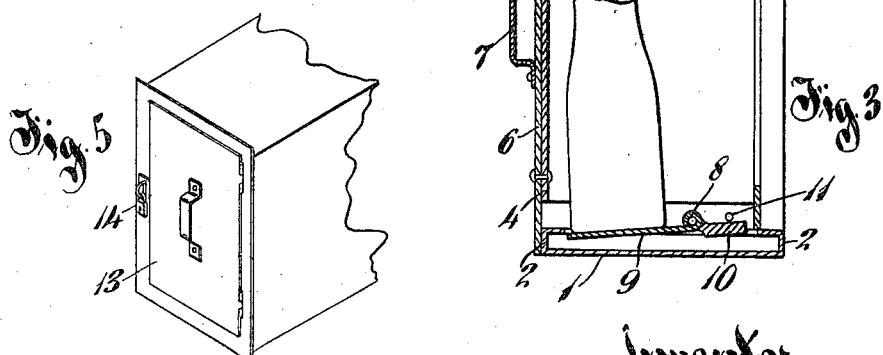
Witnesses
Earl W. Griffin
Bessie A. Beall
Inventor
Morgan Kerwick,
By Arthur H. Ewald,
Atty.

UNITED STATES PATENT OFFICE.

MORGAN KERWICK, OF CINCINNATI, OHIO.

RECEPTACLE.

972,456.     Specification of Letters Patent.     Patented Oct. 11, 1910.

Application filed August 18, 1909. Serial No. 513,483.

*To all whom it may concern:*

Be it known that I, MORGAN KERWICK, a citizen of the United States, and a resident of Cincinnati, county of Hamilton, and State of Ohio, have invented a new and useful Improvement in Receptacles, of which the following is a full, clear, and exact description, reference being had to the accompanying drawings, forming a part of this specification.

My invention relates to a receptacle which will remain unlocked and which may therefore be readily opened so long as it is empty, but which locks itself automatically when closed after being filled.

The object of my invention specifically is to provide a receptacle for milk in bottles or other vessels, which may either be built into houses and refrigerators or apart therefrom, and which will lock automatically upon being closed after the bottles or other vessels containing the milk have been deposited in it, thereby removing the milk from liability to the depredations of animals or thieves. My new receptacles, when built into houses or large refrigerators are so constructed that the contents may be removed indoors from the rear end of the receptacle.

In the drawings: Figure 1 is a perspective of my new receptacle, open. Fig. 2 is a section, open. Fig. 3 is a section, with the upper part broken away, closed and locked. Fig. 4 is an enlarged section with the upper part broken away, showing the locking mechanism. Fig. 5 is a modification of my invention showing construction when contents are to be removed from front of receptacle.

The numeral 1 indicates a rectangular frame constructed of any suitable material, preferably of sheet metal, having neither front nor rear sides. The bottom of said frame is constructed separately therefrom, and the front and rear sides thereof are turned over forming the rectangular flanges 2—2 inside of the frame 1; the other two sides of said bottom are similarly turned over to form the rectangular flanges 3—3, also inside the frame 1. Adapted to fit into said frame 1, and to slide therein on the side flanges 3—3, is the interior frame 4 having the solid top 5 and the front plate 6 carrying the handle 7. At least one of the sides of said frame should be left open for the deposit of the bottles or other vessels; and when it is desired to remove the contents of the receptacle from the back, the rear of said interior frame should also be left open. Pivotally mounted on the axis 8 in said interior frame 4, and forming a bottom therefor, is the trap 9, the long end of which is constructed of proper length to clear the front flange 2 when it swings on said axis 8 while the receptacle is closed, as shown in Fig. 3. The short end of said trap is provided with a weight 10, to maintain the long end at a sufficient elevation to clear the front flange 2, when the receptacle is empty, and thus permit the receptacle to be opened by drawing out the interior part 4, by means of the handle 7, for the deposit of the bottles or other vessels; these are necessarily placed on the long, or front, end of the trap 9, the opposite end being too short for their accommodation. When the receptacle is again closed, the weight of the vessels, overbalancing the weight 10, lowers the long end of the trap below the front flange 2, thus locking the receptacle. To prevent the long end of the trap from becoming too much depressed upon the deposit of the vessels, I provided the stop or stops 11, suitably located to arrest the short end at the proper point in its upward movement. Suitable stops 12, are also provided to prevent the interior frame 4 from being too far drawn out of the outer frame 1. These stops 12 may be located either at the top or at the sides as shown, or in any other convenient place.

The description thus far has related chiefly to a receptacle to be built into a house or large refrigerator, where it is to be opened and the contents removed from the rear. When thus constructed a suitable door may be readily added to close it from the inside of the house. When it is desired to open the receptacle and remove the contents from the front, however, a construction similar to that shown in Fig. 5 is employed, where the front plate 6 carries a hinged door 13, supplied with a lock 14, so that when the receptacle is filled, closed, and locked by the depression of the trap, the contents may be removed through the door 13.

Many obvious modifications in the details of construction employing the principle above described are within contemplation in the above disclosure and within the spirit and scope of my invention.

Having thus described my invention, what

I claim as new and desire to secure by Letters Patent, is:

A receptacle comprising an outer frame, open at one end, and having an upturned flange on the bottom of said outer frame at its open end, and an inner frame having a closed front and a bottom pivotally mounted near the rear of said inner frame, said inner frame being adapted to slide in and out of said outer frame, and said pivotally mounted bottom being adapted to depress when deposit is made in said receptacle and the front of said inner frame is contiguous to said outer frame to prevent the outward slide of said inner frame by the engagement of said bottom and said upturned flange.

MORGAN KERWICK.

Witnesses:
R. P. HARGITT,
EARL W. GRIFFIN.